July 22, 1969 D. H. MEHRTENS 3,457,518

CAPACITOR BIASED LONG-TAILED PAIR DETECTOR CIRCUIT

Filed Sept. 6, 1966

Inventor:
David H. Mehrtens
By Kemon, Palmer, Stewart & Estabrook
Attorneys

United States Patent Office 3,457,518
Patented July 22, 1969

3,457,518
CAPACITOR BIASED LONG-TAILED PAIR DETECTOR CIRCUIT

David Henry Mehrtens, Harlow, Essex, England, assignor to A. C. Cossor Limited, Harlow, Essex, England Filed Sept. 6, 1966, Ser. No. 577,265
Claims priority, application Great Britain, Sept. 9, 1965, 38,587/65
Int. Cl. H05k 7/00
U.S. Cl. 329—101 12 Claims

ABSTRACT OF THE DISCLOSURE

The use of diodes in a detector circuit is avoided by connecting a capacitor to the emitter of one transistor in a long-tailed pair circuit to provide an automatic biasing means for the circuit such as to allow the transistor to conduct during cycles of one polarity only of an input carrier applied to the base thereof.

Figure 1:
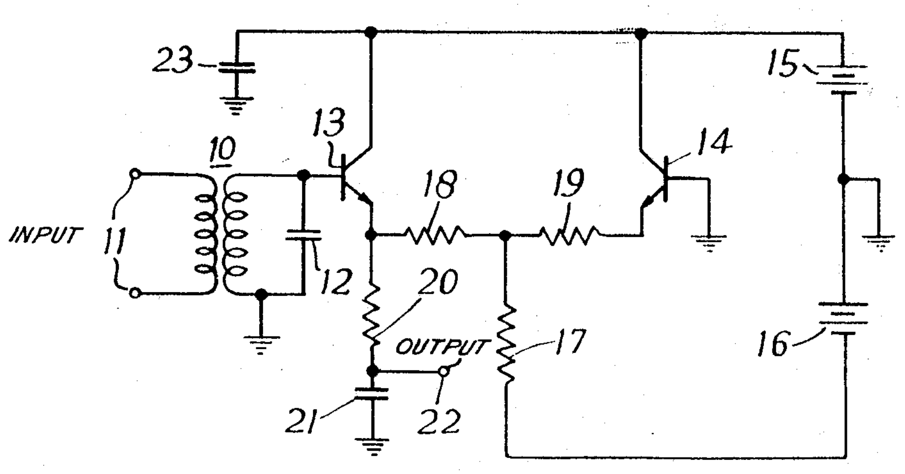

The present invention relates to electrical circuits for detecting, that is demodulating, bursts of a carrier signal to provide unidirectional pulses, or for detecting an amplitude-modulated signal to provide a varying d.c. signal.

Detector circuits have in the past often included a diode which rectifies the carrier signal and passes it to a smoothing circuit. One of the problems in using such a circuit is that the carrier signal is often of insufficient amplitude to overcome the intrinsic voltage of the energy barrier of the diode, and hence the diode has to be forward biased to a suitable d.c. operating point.

A further form of detector sometimes known as an infinite impedance detector may consist (in transistor terms) as an emitter follower or collector follower with a capacitative load. For this circuit there are conflicting requirements to establish the bias point, since as there is only one resistor its value has to be chosen to be large enough to accommodate the bias voltage amplitude, and low enough to preserve the appropriate time constant, which may in a high frequency application be somewhat short.

According to the present invention there is provided a detector circuit including first and second transistors or first and second thermionic valves with their emitter electrodes or cathodes connected together, a pair of termiinals for the connection of an electrical source, one terminal being connected to the collector electrodes of the transistors or the anodes of the valves, and the other terminal being connected by way of a common resistor to the emitter electrodes or cathodes, the resistor being of such resistance that the emitters or cathodes are supplied from a constant current source when an electrical source is connected to the terminals, means for applying an input signal to be detected to the base of the first transistor or the grid of the first valve, and biasing means for allowing the first transistor or the first valve to conduct during either positive or negative half cycles only of the input signal.

The circuit is basically of the long-tailed pair type, which has high input impedance, so modified that the first transistor or valve conducts during the time that the carrier signal is of one polarity. The rectified output signal may be taken from one terminal of a resistor connected to the emitter or collector of either transistor, or the anode or cathode of either valve. In one arrangement a further resistor of low resistance and a capacitor may be connected in series between the emitter of the first transistor or the cathode of the first valve and a point of fixed potential, the output signal appearing at the electrode of the capacitor which is connected to the further resistor.

Thus a detector circuit is provided and no biasing problem is encountered.

The point of fixed potential may, for example, be a common terminal, to which the base electrodes of the transistors, or the grids of the valves are connected, or the collector electrodes of the transistors, or the anodes of the valves.

When transistors are used, the means for applying the input signal may include a transformer whose secondary winding is tuned with a capacitor and connected to the base of said one transistor. In another arrangement a radio-frequency choke is connected between the base of the said one transistor and the common terminal, a drive transistor with a tuned-circuit load being connected through a coupling capacitor to the base of the said one transistor.

An active device in this specification and claims means a thermionic tube, a transistor, or like device. The anode, cathode and control electrodes refer in the case of a transistor to the collector, emitter and base terminals of the transistor.

Figure 2:
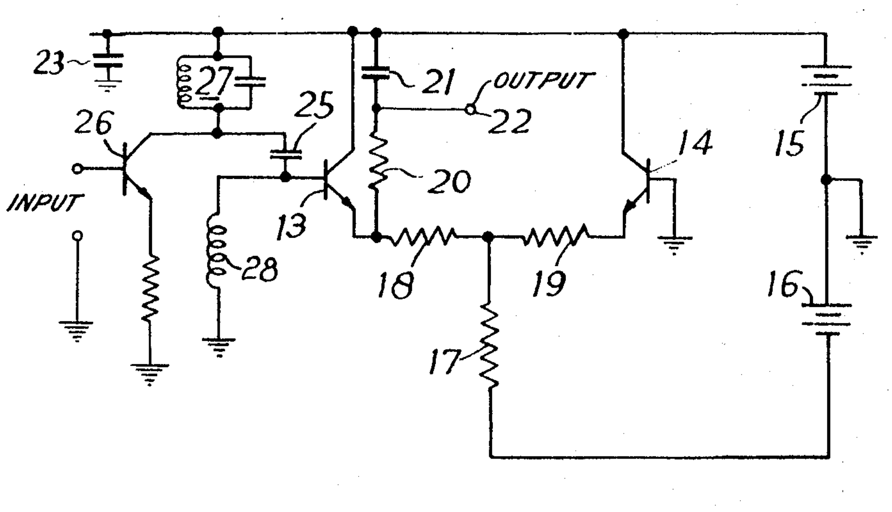

The invention will now be described, by way of example, with reference to the accompanying drawings in which:

FIG. 1 is the circuit diagram of a first embodiment of a detector circuit according to the present invention, and FIG. 2 is the circuit diagram of a second embodiment of a detector circuit according to the present invention.

The construction of the circuit of FIG. 1 will be apparent from the figure and the following description of operation of the circuit.

The input carrier signal to be detected is applied to a transformer 10 by way of input terminals 11. The secondary winding of the transformer is tuned by a capacitor 12 to the frequency of the carrier signal. The carrier signal thus reaches the base or control of a transistor 13, which is connected to ground by way of a D.C. short circuit, that is the transformer secondary winding. The transistor 13 together with another transistor 14 which has its base or control electrode connected directly to ground are biased for conduction in the absence of an input signal by means of a battery 15 connected between their first collector electrodes and ground, and a battery 16 connected between ground and the second or emitter electrodes of the transistors. The power supply terminals for the circuits are thus the outer terminals of the voltage source constituted by the series connected batteries. The battery 16 is connected by way of a high resistance 17 and resistors 18 and 19 of low resistance. The battery 16 and the high resistance 17 form a constant current source. The emitter electrode of the transistor 13 is connected through a resistor 20 of low resistance and a capacitor 21 to earth, and an output terminal 22 is provided for the detected output signal.

The capacitor 21 is so charged in the absence of an input signal that the terminal 22 is slightly negative with respect to ground. When a positive half-cycle of the input signal drives the base electrode of the transistor 13 positive the current through the resistor 18 increases and the capacitor 21 is charged in the opposite sense, making the output terminal 22 positive. The increase of current through the transistor 13 is at the expense of the current through the transistor 14 since they are both connected to the constant current source consisting of the resistor 17 and the battery 16. The next negative half-cycle of the input signal reverse-biases the transistor 13 because its emitter is held positive by the charge on the capacitor 21. When the transistor 13 is reverse-biased, most of the current from the constant current source flows through the transistor 14 but the capacitor 21 is also discharging with a time constant dependent on its capacitance and on the sum of the resistors 18, 19 and 20. The resistor 20 may however be eliminated by suitable choice of the transistor 13.

Thus a basically long-tailed pair circuit of high input impedance is provided for the input signal, and a rectified signal appears at the terminal 22 with an envelope depending on the modulation of the input signal, provided the time constant of the capacitor 21 and its associated circuit is suitably arranged.

A capacitor 23 is provided to decouple the battery 15, if required.

In the circuit of FIG. 2 components which have the same functions as in FIG. 1 are given the same references. There are two differences between FIG. 1 and FIG. 2, and these may be applied to FIG. 1 either separately, or together as shown in FIG. 2.

The first difference is in the way of supplying the input signal to the transistor 13 and is used where a coupling capacitor 25 has to be used, for example where a transistor 26 is part of an intermediate-frequency amplifier with a tuned-circuit load 27 coupled to its collector electrode. In this case a radio-frequency choke 28 provides the required D.C. connection to ground for the base of the transistor 13.

The second difference is in the position of the output terminal 22. In this case, the capacitor 21 and the resistor 20 are, as may often be convenient, connected between the emitter electrode of the transistor 13 and the positive terminal of the battery 15. In fact the terminal of the capacitor 21 remote from the resistor 20 could be connected to any point of fixed potential, but the positive terminal of the battery 15 provides a better return path for the carrier frequency component of the signal.

As in the circuit of FIG. 1, the capacitor 21 is charged to make the terminal 22 negative, when no input signal is applied, but in the presence of an input signal becomes so charged that the transistor 13 is forward-biased for positive half-cycles of the input signal and reverse-biased for negative half-cycles.

Circuits according to the invention may be used for detecting pulses or for detecting amplitude modulation. In one example where pulses having a carrier frequency of 60 mc./s. are to be detected, the capacitor 21 was of 22 sf., the resistors 18, 19 and 20 were of 100 ohms, 100 ohms and 50 ohms, respectively, and the current supplied through the resistor 17 was 0.5 ma.

Other ways of using long-tailed pair circuits as detector circuits, according to the invention will be apparent. For example the output signal could be taken from a load resistor connected between the collector of either transistor and the battery. A capacitor connected to the load resistor could then provide a time constant for the output circuit which would cause the output signal to be proportional to the magnitude of either the positive or negative boundary of the input signal envelope. The capacitor 21 could be an inter-wiring capacitor if the circuit were laid out as an integral or micro-miniature circuit. Either of the resistors 18 or 19 could be moved to the base circuit of transistors 13 or 14, respectively, if suitably modified by a factor equal to the current gain of the transistor. The circuits of FIGS. 1 and 2 can also be modified by not having a direct short circuit between the transistor bases. In this case one transistor will in the absence of an input signal take more current than the other. The current supplied to the emitters will still be constant, and any change in the current taken by one transistor will be reflected by an equal and opposite change in the current taken by the other.

I claim:

1. A detector circuit including
first and second active devices having first electrodes, second electrodes and control electrodes, said second electrodes being connected together,
a pair of power supply terminals, one of said terminals being connected to said first electrodes of said devices,
a first resistor connected between the other of said terminals and said second electrodes, said first resistor being of high resistance for forming a constant current source feeding said second electrodes,
means for applying an input signal to the control electrode of said first device,
a point of fixed potential, and
a biasing capacitor between said point and said second electrode of said first device, said capacitor becoming charged, during half cycles of said input signal of one polarity, to a voltage dependent on the amplitude of said half cycles, and said voltage preventing said first device from conducting during the half cycles of said input signal of the other polarity.

2. A detector circuit according to claim 1 including
a second resistor of low resistance compared with said first resistor connected in series with said capacitor between said point of fixed potential and said second electrode of said first device.

3. A detector circuit according to claim 2, wherein said second electrodes are connected together through means having a low resistance compared with said first resistor.

4. A detector circuit according to claim 3 wherein
said means having a low resistance includes third and fourth resistors connected in series, said first resistor being connected to the junction of said third and fourth resistors.

5. A detector circuit according to claim 2 wherein the control electrodes of said devices are connected to a commond terminal by way of a direct-current short circuit.

6. A detector circuit according to claim 5 including a voltage source connected between said power supply terminals, said source having a tapping point connected to said common terminal.

7. A detector circuit according to claim 5 wherein
said first and second devices are first and second transistors, having collector, emitter and base electrodes constituting said first, second and control electrodes respectively,
said means for applying an input signal to said first device is a transformer having a secondary winding connected between said base terminal of said first transistor and said common terminal, and
an additional capacitor is connected across said secondary winding to tune said winding to the frequency of said input signal.

8. A detector circuit according to claim 5 wherein
said first and second devices are first and second transistors, having collector, emitter and base electrodes constituting said first, second and control electrodes respectively, and said detector circuit includes
a radio frequency choke connected between the base of the first transistor and said common terminal,
a coupling capacitor,
a drive transistor coupled to the base of said first transistor by way of said coupling capacitor, and
a tuned-circuit load for said drive transistor, tuned to the frequency of said input signal.

9. A detector circuit according to claim 4 wherein the control electrodes of said devices are connected to a common terminal by way of a direct-current short circuit.

10. A detector circuit according to claim 9 including a voltage source connected between said power supply terminals, said source having a tapping point connected to said common terminal.

11. A detector circuit according to claim 10 wherein
said first and second devices are first and second transistors, having collector, emitter and base electrodes constituting said first, second and control electrodes respectively,
said means for applying an input signal to said first device is a transformer having a secondary winding connected between said base terminal of said first transistor and said common terminal, and
an additional capacitor is connected across said secondary winding to tune said winding to the frequency of said input signal.

12. A detector circuit according to claim 1 wherein said point of fixed potential is said one power supply terminal.

References Cited

UNITED STATES PATENTS

| | | | |
|---|---|---|---|
| 3,013,159 | 12/1961 | De Sautels | 307—393 X |
| 3,075,150 | 1/1963 | Berman et al. | 329—101 X |
| 3,239,768 | 3/1966 | Sikorra | 329—50 |
| 3,292,091 | 12/1966 | Kosanke et al. | 328—78 X |
| 3,328,607 | 1/1967 | Stromer | 307—235 X |
| 3,386,041 | 5/1968 | Bell | 307—246 X |

ALFRED L. BRODY, Primary Examiner

U.S. CL. X.R.

307—235, 236, 246, 293; 328—73